United States Patent
Makoto (10) Patent No.: US 8,952,668 B2
(45) Date of Patent: Feb. 10, 2015

(54) SWITCHING POWER SUPPLY DEVICE (75) Inventor: Yasusaka Makoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 536 days.

(21) Appl. No.: 13/303,387

(22) Filed: Nov. 23, 2011

(65) Prior Publication Data

US 2012/0133344 A1 May 31, 2012

(30) Foreign Application Priority Data

Nov. 25, 2010 (JP) .................................. 2010-261977

(51) Int. Cl.
H02M 3/156 (2006.01)
H02M 1/00 (2006.01)

(52) U.S. Cl.
CPC ...... *H02M 3/156* (2013.01); *H02M 2001/0025* (2013.01)
USPC ......................................................... 323/282

(58) Field of Classification Search
USPC .................. 323/282, 284, 288, 351
See application file for complete search history.

(56) References Cited

U.S. PATENT DOCUMENTS 6,369,555 B2 * 4/2002 Rincon-Mora ............... 323/282
6,583,610 B2 * 6/2003 Groom et al. ................. 323/288

FOREIGN PATENT DOCUMENTS

JP 2010-035316 2/2010

* cited by examiner

*Primary Examiner* — Gary L Laxton
*Assistant Examiner* — Afework Demisse
(74) *Attorney, Agent, or Firm* — Fish & Richardson P.C.

(57) ABSTRACT

A switching power supply device of a nonlinear control manner is provided, which includes: a reference voltage generation portion, for generating a reference voltage; a ripple injection portion, for using a switch voltage at one end of a switch element to generate a ripple component, and injecting the ripple component into the reference voltage to generate a ripple reference voltage; a comparator, for comparing a feedback voltage corresponding to an output voltage with the ripple reference voltage; a switching control portion, for performing on/off control on the switch element based on an output signal of the comparator; and an offset adjustment portion for generating an offset voltage corresponding to the switch voltage, and setting any of the reference voltage, the feedback voltage, and the ripple reference voltage to the offset voltage.

15 Claims, 6 Drawing Sheets

SWITCHING POWER SUPPLY DEVICE

BACKGROUND OF THE INVENTION

1. Field of the Invention

The present invention relates to a switching power supply device using a nonlinear control manner.

2. Description of the Related Art

Figure 11A:
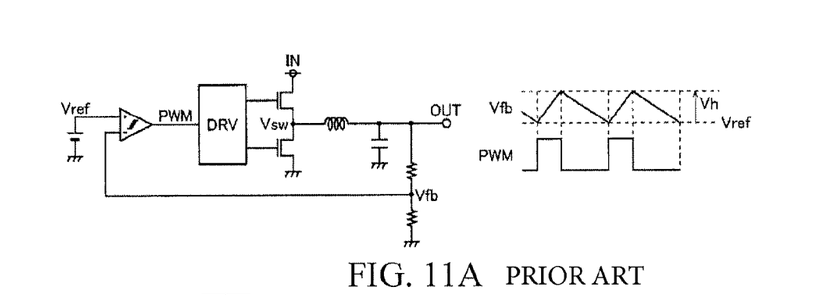
FIG. 11A is a circuit block diagram and an action waveform diagram of a first conventional example (a hysteretic window manner) of a switching power supply device using a nonlinear control manner.
Figure 11B:
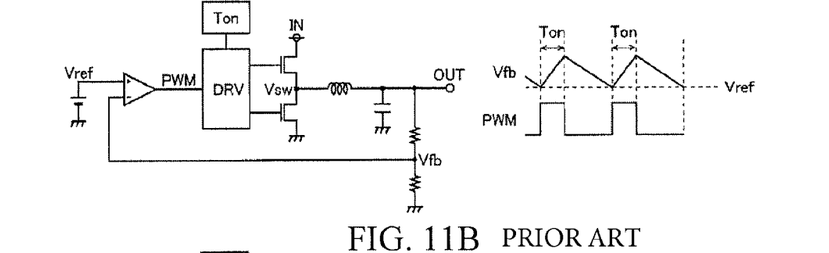
FIG. 11B is a circuit block diagram and an action waveform diagram of a second conventional example (a lower limit detection on-time fixed manner) of a switching power supply device using a nonlinear control manner.
Figure 11C:
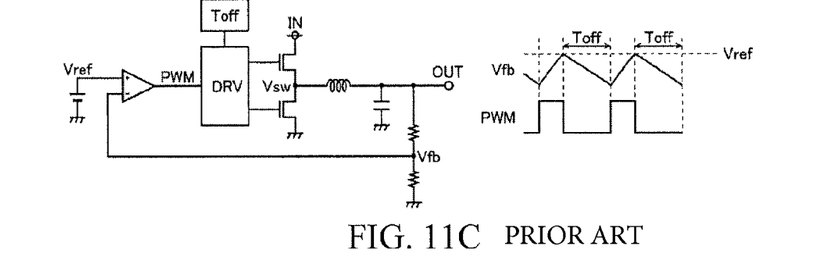
FIG. 11C is a circuit block diagram and an action waveform diagram of a third conventional example (an upper limit detection off-time fixed manner) of a switching power supply device using a nonlinear control manner.

FIG. 11A to FIG. 11C are all prior art examples of circuit block diagrams and action waveform diagrams of a switching power supply device using a nonlinear control manner, in which FIG. 11A illustrates a switching power supply device using a hysteretic window manner, FIG. 11B illustrates a switching power supply device using a lower limit detection on-time fixed manner, and FIG. 11C illustrates a switching power supply device using an upper limit detection off-time fixed manner. The switching power supply devices illustrated respectively in FIG. 11A to FIG. 11C are all step-down Direct Current (DC)/DC converters, which reduce an input voltage IN to generate a desired output voltage OUT.

Compared with a switching power supply device using a linear control manner (for example, a voltage mode control manner or a current mode control manner), the switching power supply device using the nonlinear control manner has advantages including simple circuit configuration and capability of achieving a high load response characteristic.

On the other hand, the switching power supply device of the nonlinear control manner is configured to use an output ripple voltage (=a ripple component of an output voltage OUT) to drive a comparator, so as to perform switching control on an output transistor. Consequently, in order to accurately detect the output ripple voltage, a large amplitude (peak value) output ripple is required. Conventionally, therefore, an output capacitor (for example conductive polymer-based) of large Equivalent Series Resistance (ESR) has to be used, thereby limiting selection of parts and increasing cost.

Conventionally a so-called ripple injection technique is utilized, in which a ripple component is externally injected in a forced manner into a reference voltage Vref input into a comparator to drive the comparator steadily. Adopting the ripple injection technology allows steady switching control to be performed even if the amplitude of the output ripple voltage becomes very large. Therefore, a multilayer ceramic capacitor of small ESR may be used as an output capacitor.

A related example in the prior art is shown in Patent document 1.

PATENT DOCUMENT

Patent document 1: Japanese Patent Publication No. 2010-35316.

SUMMARY OF THE INVENTION

A DC value of a reference voltage Vref into which a ripple component is injected varies according to the duty of a switch voltage Vsw (a pulse voltage at one end of an output transistor) used during generation of the ripple component. Particularly, increasing the amount of ripple injection (the amplitude of the ripple component injected into the reference voltage Vref) causes more dramatic variation of the DC value of the reference voltage Vref into which the ripple component is injected.

Thus, conventional switching power supply devices have the following problems. If the amount of ripple injection is increased to improve steadiness of a switching action and a jitter characteristic, the precision of the output voltage or load regulation characteristic (the steadiness of the output voltage OUT relative to variation of the load) deteriorates. The problem is particularly obvious in a switching power supply device operating at high-efficiency with a light load.

Accordingly, the present invention is directed to a switching power supply device which can increase the amount of ripple injection without deteriorating the precision of the output voltage or the load regulation characteristic, thereby improving the steadiness of the switching action or jitter characteristic.

In order to achieve the objective, the switching power supply device of the present invention utilizes a nonlinear control manner which switches on/off a switch element to generate an output voltage from an input voltage, and includes: a reference voltage generation portion, for generating a reference voltage; a ripple injection portion, for using a switch voltage at one end of the switch element to generate a ripple component, and injecting the ripple component into the reference voltage to generate a ripple reference voltage; a comparator, for comparing a feedback voltage corresponding to the output voltage with the ripple reference voltage; a switching control portion, for performing on/off control on the switch element based on an output signal of the comparator; and an offset adjustment portion, for generating an offset voltage corresponding to the switch voltage, and setting any of the reference voltage, the feedback voltage, and the ripple reference voltage to the offset voltage (First configuration).

In the switching power supply device including the first configuration, the ripple injection portion may be configured to include a first amplifier. A non-inverting input end of the first amplifier is connected to an application end of the reference voltage, an inverting input end of the first amplifier is connected to an application end of the switch voltage through a first resistor, and an output end of the first amplifier is connected to an application end of the ripple reference voltage and connected to the inverting input end through a second resistor and a first capacitor, respectively (Second configuration).

In the switching power supply device including the second configuration, the offset adjustment portion may be configured to include a filter circuit, for smoothing the switch voltage to generate a smoothed switch voltage; a voltage/current conversion circuit, for converting the smoothed switch voltage into an offset current; and a current/voltage conversion circuit, for converting the offset current into the offset voltage (Third configuration).

In the switching power supply device including the third configuration, the filter circuit may be configured to include: a third resistor, having a first end connected to the application end of the switch voltage and a second end connected to an application end of the smoothed switch voltage; and a second capacitor, having a first end connected to the application end of the smoothed switch voltage and a second end connected to a grounding end (Fourth configuration).

In the switching power supply device including the fourth configuration, the voltage/current conversion circuit may be configured to include: a fourth resistor; a bias circuit, for applying the smoothed switch voltage to the fourth resistor; and a current mirror circuit, for mirroring a current flowing into the fourth resistor to generate the offset current (Fifth configuration).

In the switching power supply device including the fifth configuration, the bias circuit may be configured to include: a second amplifier, having a non-inverting input end connected to the application end of the smoothed switch voltage and an inverting input end connected to the fourth resistor; and an N-channel type field-effect transistor (FET), having a drain connected to the current mirror circuit, a source connected to the fourth resistor, and a gate connected to an output end of the second amplifier (Sixth configuration).

In the switching power supply device including the fifth configuration, the bias circuit may be configured to include: a constant current source, having a first end connected to a power supply end; a pnp-type bipolar transistor, having an emitter connected to a second end of the constant current source, a collector connected to the grounding end, and a base connected to the application end of the smoothed switch voltage; and an npn-type bipolar transistor, having a collector connected to the current mirror circuit, an emitter connected to the fourth resistor, and a base connected to the emitter of the pnp-type bipolar transistor (Seventh configuration).

In the switching power supply device including any of the fifth to seventh configurations, the current/voltage conversion circuit may be configured to include a fifth resistor for converting the offset current into the offset voltage (Eighth configuration).

In the switching power supply device including the eighth configuration, the offset adjustment portion may be configured to set the reference voltage to the offset voltage, and enable an equation (R1+R2):R2=R4:R5 to be satisfied when resistance values of the first resistor, the second resistor, the fourth resistor, and the fifth resistor are set to R1, R2, R4, and R5 (Ninth configuration).

In the switching power supply device including the eighth configuration, the offset adjustment portion may be configured to set the feedback voltage or the ripple reference voltage to the offset voltage; and enable an equation R1:R2=R4:R5 to be satisfied when resistance values of the first resistor, the second resistor, the fourth resistor, and the fifth resistor are set to R1, R2, R4, and R5 (Tenth configuration).

BENEFICIAL EFFECTS OF THE PRESENT INVENTION

The switching power supply device according to the present invention can increase the amount of ripple injection without deteriorating the precision of the output voltage or the load regulation characteristic, thereby improving the steadiness of the switching action or the jitter characteristic.

BRIEF DESCRIPTION OF THE DRAWINGS

The invention will be described according to the appended drawings in which.

PREFERRED EMBODIMENT OF THE PRESENT INVENTION

<First Embodiment>

Figure 1:
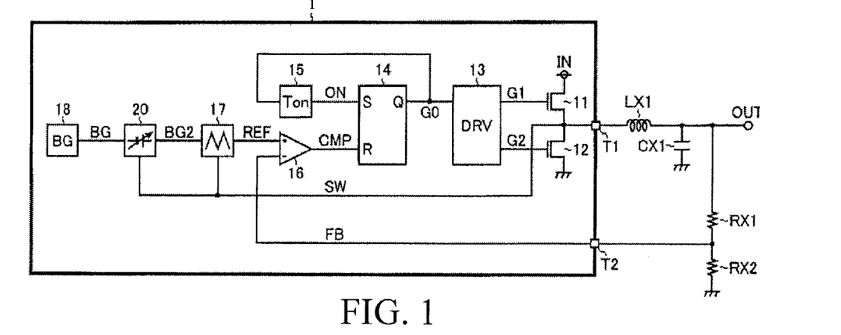
FIG. 1 is a circuit block diagram of a first embodiment of a switching power supply device according to the present invention.

FIG. 1 is a circuit block diagram of a first embodiment of a switching power supply device according to the present invention. The switching power supply device of this embodiment is a step-down DC/DC converter for generating an output voltage OUT from an input voltage IN by a nonlinear control manner (herein a lower limit detection on-time fixed manner), and includes a semiconductor device 1; an inductor LX1, a capacitor CX1, and resistors RX1 and RX2 are placed on the semiconductor device 1 externally.

Outside the semiconductor device 1, a first end of the inductor LX1 is connected to an external terminal T1 (a switch terminal) of the semiconductor device 1. A second end of the inductor LX1, a first end of the capacitor CX1, and a first end of the resistor RX1 are all connected to an output end of the output voltage OUT. A second end of the capacitor CX1 is connected to a grounding end. A second end of the resistor RX1 and a first end of the resistor RX2 are both connected to an external terminal T2 (a feedback terminal) of the semiconductor device 1. A second end of the resistor RX2 is connected to the grounding end.

The semiconductor device 1 is a so-called switching power supply integrated circuit (IC) integrating N-channel type metal oxide semiconductor field-effect transistors (MOSFETs) 11 and 12, a driver 13, a set reset (SR) trigger 14, an on-time setting portion 15, a comparator 16, a ripple injection portion 17, a bandgap power supply portion 18, and an offset adjustment portion 20.

The transistor 11 is an output transistor, which is connected between an input end of the input voltage IN and the external terminal T1, and performs on/off control according to a gate signal G1 input from the driver 13. Specifically, the connection relationship is as follows. A drain of the transistor 11 is connected to the input end of the input voltage IN. A source of the transistor 11 is connected to the external terminal T1. A gate of the transistor 11 is connected to an input end of the gate signal G1.

The transistor 12 is a synchronous rectification transistor, which is connected between the external terminal T1 and the grounding end, and performs on/off control according to a gate signal G2 input from the driver 13. Specifically, the connection relationship is as follows. A drain of the transistor 12 is connected to the external terminal T1. A source of the transistor 12 is connected to the grounding end. A gate of the transistor 12 is connected to an input end of the gate signal G2. Furthermore, a diode may be used to replace the transistor 12 to act as a rectification element.

The driver 13 generates the gate signals G1 and G2 according to an output signal G0 of the SR trigger 14, so as to perform switching control on the transistors 11 and 12 complementarily (exclusively). In addition to the case in which the on/off of the transistors 11 and 12 are contrary to each other, the term "complementarily (exclusively)" used herein further involves the case (the case in which a simultaneous off-period is set for both) in which a specific delay is incurred to a transition time of on/off of the transistors 11 and 12 in view of prevention of a shoot-through current.

Figure 2:
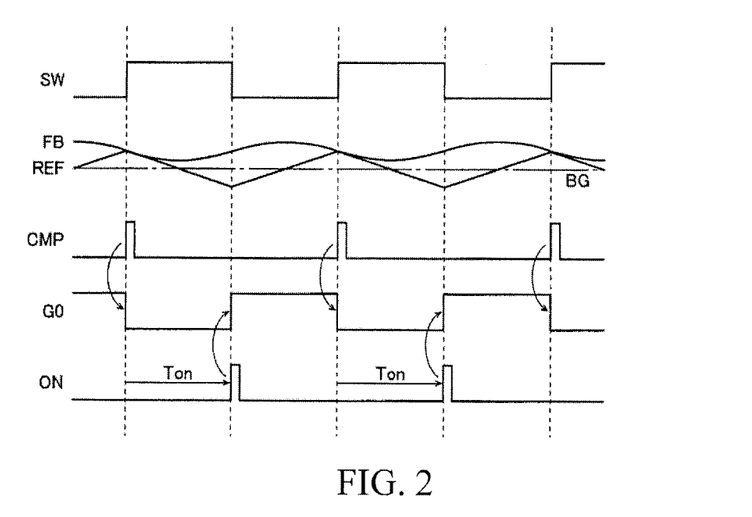
FIG. 2 is a timing diagram of an example of a switching action.

The SR trigger 14 fixes the output signal G0 to a high level on a rising edge of an on-time setting signal ON input to a set end (S), and resets the output signal G0 to a low level on a rising edge of a comparison signal CMP input to a reset end (R) (referring to the third section to the fifth section from top to bottom in FIG. 2).

After the output signal G0 of the SR trigger 14 falls to the low level and after a specific on-time Ton, the on-time setting portion 15 generates a high level trigger pulse for the on-time setting signal ON (referring to the fourth section and the fifth section from top to bottom in FIG. 2).

In addition, the driver 13, the SR trigger 14, and the on-time setting portion 15 act as a switching control portion to implement functions, which performs the on/off control on the transistors 11 and 12 based on the comparison signal CMP output from the comparator 16.

The comparator 16 compares a feedback voltage FB (a divided voltage of the output voltage OUT) input from the external terminal T2 (a connecting node of the resistor R1 and the resistor R2) to an inverting input end (−) with a ripple reference voltage REF input from the ripple injection portion 17 to a non-inverting input end (+), so as to output the comparison signal CMP. That is, if the feedback voltage FB is higher than the ripple reference voltage REF, the comparison signal CMP turns to the low level; and on the contrary if the feedback voltage FB is lower than the ripple reference voltage REF, the comparison signal CMP turns to the high level (referring to the second section and the third section from top to bottom in FIG. 2).

The ripple injection portion 17 uses a switch voltage SW at the external terminal T1 (a connecting node of the transistor 11 and the transistor 12) to generate a ripple component, injects the ripple component into a bandgap reference voltage BG (a bandgap reference voltage BG2 having an offset in FIG. 1), so as to generate the ripple reference voltage REF (referring to the first section and the second section from top to bottom in FIG. 2).

The bandgap power supply portion 18 generates the specific bandgap reference voltage BG (for example, 1.2 V) independent of variation of a power supply voltage and an ambient temperature.

The offset adjustment portion 20 generates an offset voltage Voffset corresponding to the switch voltage SW, and adds the offset voltage Voffset to the bandgap reference voltage BG, so as to generate the bandgap reference voltage BG2 having the offset. More specifically, if duty (DUTY) (a ratio of a high level period Ton (an on-period Ton of the transistor 11) to a switching cycle T, DUTY=Ton/T) of the switch voltage SW is greater, the offset adjustment portion 20 sets a greater voltage value of the offset voltage Voffset (specifically the bandgap reference voltage BG2 having the offset). Accordingly, a DC value of the ripple reference voltage REF also increases, so that feedback control is performed by further increasing the output voltage OUT (specifically, the feedback voltage FB).

Figure 3:
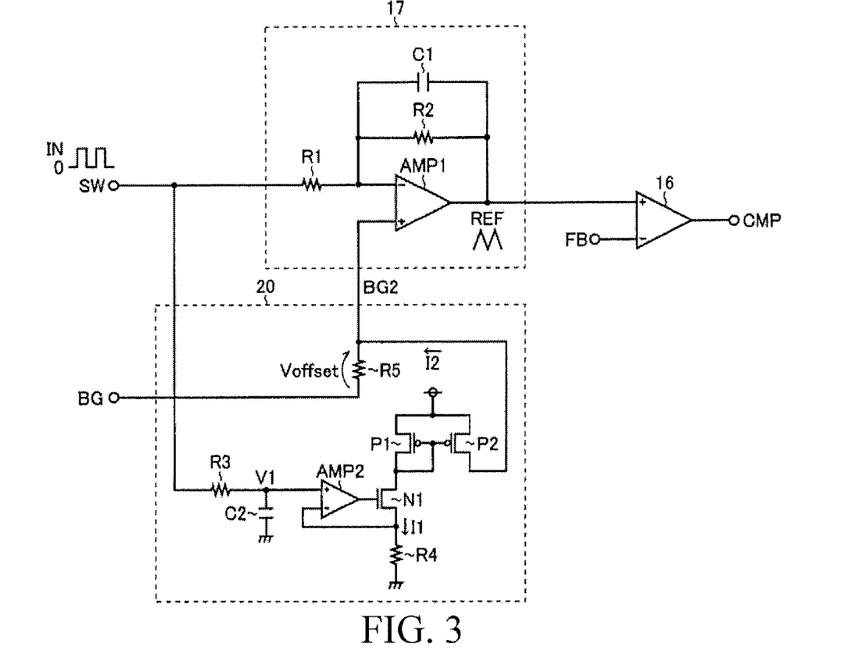
FIG. 3 is a circuit block diagram of a first configuration example of an offset adjustment portion 20.

FIG. 3 is a circuit block diagram of a first configuration example of the offset adjustment portion 20 (and the ripple injection portion 17).

The ripple injection portion 17 of the configuration example includes an amplifier AMP1, resistors R1 and R2, and a capacitor C1. A non-inverting input end (+) of the amplifier AMP1 is connected to an application end of the bandgap reference voltage BG2 having the offset. An inverting input end (−) of the amplifier AMP1 is connected to an application end of the switch voltage SW through the resistor R1. An output end of the amplifier AMP1 is connected to an application end of the ripple reference voltage REF, and is connected to the inverting input end (−) of the amplifier AMP1 through the resistor R2 and the capacitor C1, respectively.

In the ripple injection portion 17 including the configuration, the resistors R1 and R2 and the capacitor C1 act as a pulse driving portion to implement functions, which performs pulse driving on a negative feedback loop of the amplifier AMP1 according to the switch voltage SW. By setting the configuration, the ripple reference voltage REF output from the amplifier AMP1 becomes a waveform of voltage value variation by using the bandgap reference voltage BG2 having the offset as a benchmark, that is, a waveform where the ripple component is injected into the bandgap voltage BG2 having the offset.

Furthermore, the offset adjustment portion 20 of the configuration example includes an amplifier AMP2, an N-channel type MOSFET N1, P-channel type MOSFETs P1 and P2, resistors R3 to R5, and a capacitor C2. A first end of the resistor R3 is connected to the application end of the switch voltage SW. A second end of the resistor R3 is connected to an application end of a smoothed switch voltage V1. A first end of the capacitor C2 is connected to the application end of the smoothed switch voltage V1. A second end of the capacitor C2 is connected to the grounding end. A non-inverting input end (+) of the amplifier AMP2 is connected to the application end of the smoothed switch voltage V1. An inverting input end (−) of the amplifier AMP2 is connected to a first end of the resistor R4. A second end of the resistor R4 is connected to the grounding end. A drain of the transistor N1 is connected to a drain of the transistor P1. A source of the transistor N1 is connected to the first end of the resistor R4. A gate of the transistor N1 is connected to an output end of the amplifier AMP2. Sources of the transistors P1 and P2 are both connected to the power supply end. Gates of the transistors P1 and P2 are both connected to the drain of the transistor P1. A drain of the transistor P2 is connected to the first end of the resistor R5. The first end (the high level end) of the resistor R5 is connected to the application end of the bandgap voltage BG2 having the offset. The second end (the low level end) of the resistor R5 is connected to an application end of the bandgap voltage BG.

In the offset adjustment portion 20 including the configuration, the resistor R3 and the capacitor C2 act as a filter circuit to implement functions, which smoothes the switch voltage SW in the form of rectangular waves to generate the smoothed switch voltage V1 (=IN×DUTY).

In addition, the amplifier AMP2, the resistor R4, the transistor N1, and the transistors P1 and P2 act as a voltage/current conversion circuit to implement functions, which converts the smoothed switch voltage V1 into an offset current I2 (=I1=V1/R4). Particularly, the amplifier AMP2 and the transistor N1 act as a bias circuit to implement functions, which applies the smoothed switch voltage V1 to the first end of the resistor R4. In addition, the transistors P1 and P2 act as a current mirror circuit to implement functions, which mirrors the current I1 (=V1/R4) flowing into the resistor R4, so as to generate the offset current I2.

In addition, the resistor R5 acts as a current/voltage conversion circuit to implement functions, which converts the offset current I2 into the offset voltage Voffset (=I2×R5=(V1/R4)×R5=IN×(R5/R4)×DUTY).

Herein, the ripple reference voltage REF generated in the ripple injection portion 17 is acquired through equation (1) below.

[Equation 1]

$$\begin{aligned} REF &= BG2 \times \frac{R1+R2}{R1} - IN \times \frac{R2}{R1} \times DUTY \\ &= (BG + Voffset) \times \frac{R1+R2}{R1} - IN \times \frac{R2}{R1} \times DUTY \\ &= BG \times \frac{R1+R2}{R1} - IN \times \frac{R2}{R1} \times DUTY + Voffset \times \frac{R1+R2}{R1} \\ &= BG \times \frac{R1+R2}{R1} - IN \times \frac{R2}{R1} \times DUTY + IN \times \frac{R5}{R4} \times DUTY \times \frac{R1+R2}{R1} \end{aligned} \quad (1)$$

In equation (1), the first term on the right side is a constant factor independent of input/output conditions (DUTY), and the second term and the third term on the right side are variable factors dependent on the input/output conditions (DUTY). In addition, the third term on the right side is a term generated by applying the offset voltage Voffset.

Furthermore, in the offset adjustment portion 20, resistance values of the resistors R4 and R5 are adjusted by a manner in which the second term and the third term on the right side cancel each other, that is, a manner in which an equation (R1+R2):R2=R4:R5 is satisfied.

By setting the configuration, the ripple reference voltage REF is determined only according to the first term on the right side of the equation (1), so the ripple reference voltage REF can be generated independent of the input/output conditions (DUTY). Further, the precision of the output voltage or the load regulation characteristic can be improved.

Moreover, the prior art requires that the amount of ripple injection be suppressed to avoid deterioration in precision of the output voltage or load regulation characteristic; but using the configuration allows the amount of ripple injection to be increased without deteriorating the precision of the output voltage or the load regulation characteristic, thereby improving steadiness of the switching action or jitter characteristic.

Figure 4:
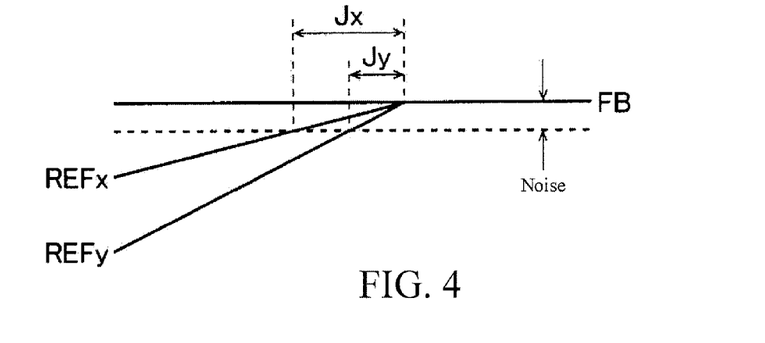
FIG. 4 is a schematic view of a relationship between an amount of ripple injection and an amount of jitter.

FIG. 4 is a schematic view of a relationship between the amount of ripple injection and amount of jitter. A cross angle of a reference voltage REFy and the feedback voltage FB when the amount of ripple injection is large is greater (deeper) than a cross angle of a reference voltage REFx and the feedback voltage FB when the amount of ripple injection is small. For example, in the case in which a jitter component of the comparison signal CMP caused by variation (referring to the dotted line in FIG. 4) of the feedback voltage FB is taken into account, jitter component Jy when REFy is input is smaller than a jitter component Jx when REFx is input. This shows that increasing the amount of ripple injection is effective with respect to improving the jitter characteristic.

Given the recent trend toward low voltage application programs, the present invention is particularly well-adapted to meet increasingly strict requirements on the output precision of switching power supply devices.

Figure 5:
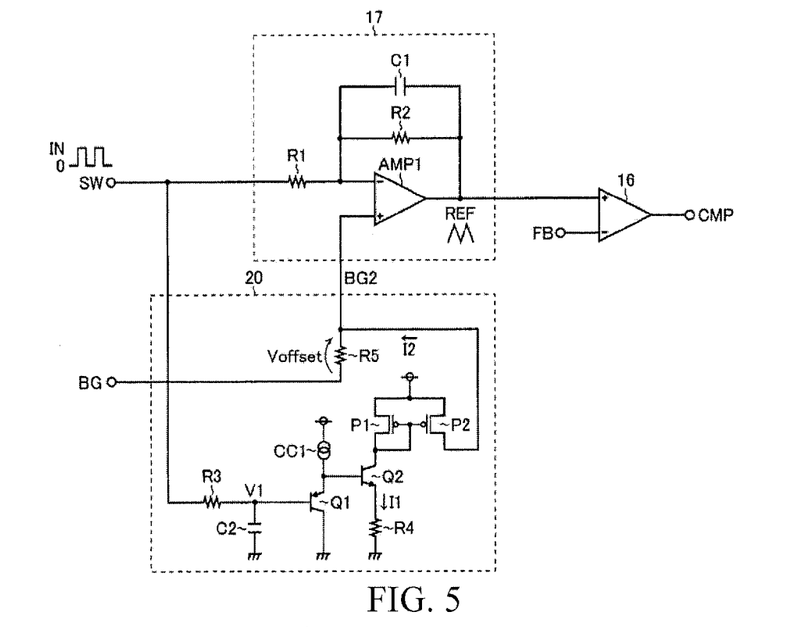
FIG. 5 is a circuit block diagram of a second configuration example of the offset adjustment portion 20.

FIG. 5 is a circuit block diagram of a second configuration example of the offset adjustment portion 20. The offset adjustment portion 20 of the configuration example being an element of a bias circuit used to apply the smoothed switch voltage V1 to the first end of the resistor R4 includes a constant current source CC1, a pnp-type bipolar transistor Q1, and an npn-type bipolar transistor Q2, and is used to replace the amplifier AMP2 and the transistor N1 in FIG. 2.

A first end of the constant current source CC1 is connected to the power supply end. A second end of the constant current source CC1 is connected to an emitter of the transistor Q1. A collector of the transistor Q1 is connected to the grounding end. A base of the transistor Q1 is connected to the application end of the smoothed switch voltage V1. A collector of the transistor Q2 is connected to the drain of the transistor P1. An emitter of the transistor Q2 is connected to the first end of the resistor R4. A base of the transistor Q2 is connected to the emitter of the transistor Q1.

Compared with the offset adjustment portion 20 of the first configuration example, the offset adjustment portion 20 of the second configuration example can decrease the scale of the bias circuit used to apply the smoothed switch voltage V1 to the first end of the resistor R4.

<Second Embodiment>

Figure 6:
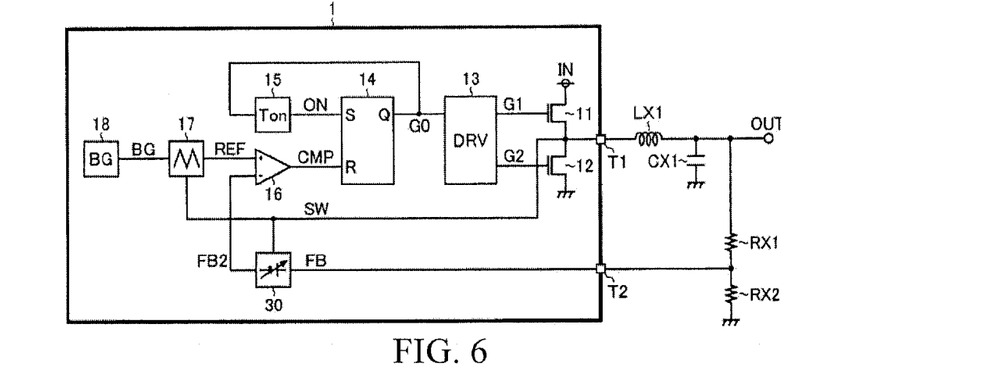
FIG. 6 is a circuit block diagram of a second embodiment of the switching power supply device according to the present invention.

FIG. 6 is a circuit block diagram of a second embodiment of the switching power supply device according to the present invention. The second embodiment includes substantially the same configuration as the first embodiment, but differences lie in the following configuration. An offset adjustment portion 30 is set to replace the offset adjustment portion 20. The offset adjustment portion 30 generates the offset voltage Voffset corresponding to the switch voltage SW, and subtracts the feedback voltage FB from the offset voltage Voffset to generate a feedback voltage FB2 having an offset.

Figure 7:
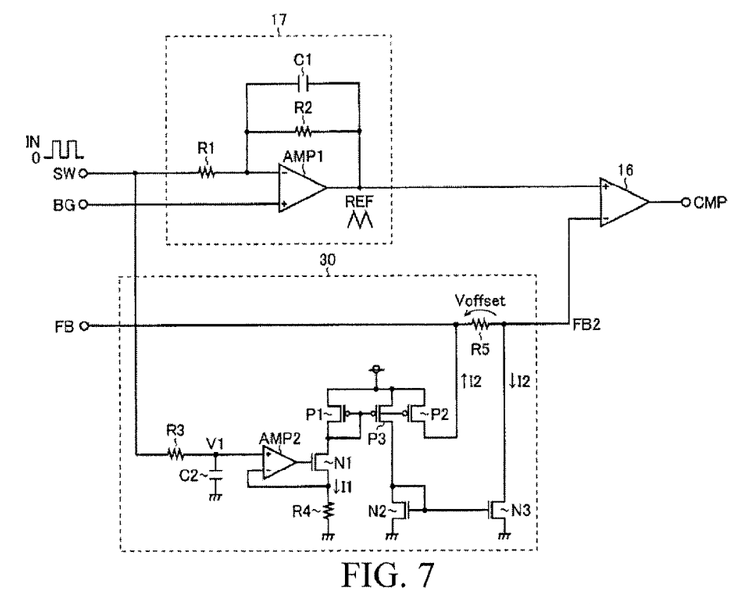
FIG. 7 is a circuit block diagram of a configuration example of an offset adjustment portion 30.

FIG. 7 is a circuit block diagram of a configuration example of the offset adjustment portion 30. The offset adjustment portion 30 of the configuration example includes substantially the same configuration as the offset adjustment portion 20 of the first configuration example shown in FIG. 3, but the differences are: elements of the current mirror circuit for mirroring the current I1 (=V1/R4) flowing into the resistor R4 including N-channel type MOSFETs N2 and N3 and a P-channel type MOSFET P3; and an insertion position of the resistor R5. The connection relationship is described below with respect to parts different from those in FIG. 3.

Sources of the transistors P1 to P3 are all connected to the power supply end. Gates of the transistors P1 to P3 are all connected to the drain of the transistor P1. The drain of the transistor P2 is connected to the first end of the resistor R5. A drain of the transistor P3 is connected to a drain of the transistor N2. Sources of the transistors N2 and N3 are both connected to the grounding end. Gates of the transistors N2 and N3 are both connected to the drain of the transistor N2. The drain of the transistor N3 is connected to the second end of the resistor R5. The first end (the high level end) of the resistor R5 is connected to the application end of the feedback voltage FB. The second end (the low level end) of the resistor R5 is connected to the application end of the feedback voltage FB2 having the offset.

In the offset adjustment portion 30 including the configuration, the amplifier AMP2, the resistor R4, the transistors N1 to N3, and the transistors P1 to P3 act as a voltage/current conversion circuit to implement functions, which converts the smoothed switch voltage V1 into the offset current I2 (=I1=V1/R4). Particularly, the amplifier AMP2 and the transistor N1 act as a bias circuit to implement functions, which applies the smoothed switch voltage V1 to the first end of the resistor R4. In addition, the transistors P1 to P3 and the transistors N2 and N3 act as a current mirror circuit to implement functions, which mirrors the current I1 (=V1/R4) flowing into the resistor R4, so as to generate the offset current I2. In addition, the configuration of FIG. 5 may also be used to act as the bias circuit.

In addition, the resistor R5 acts as a current/voltage conversion circuit to implement functions, which converts the offset current I2 into the offset voltage Voffset (=I2×R5=(V1/R4)×R5=IN×(R5/R4)×DUTY).

In addition, the ripple reference voltage REF generated in the ripple injection portion 17 is acquired through equation (2a) below, and the feedback voltage FB2 having the offset and generated in the offset adjustment portion 30 is acquired through equation (2b) below.

[Equation 2]

$$REF = BG \times \frac{R1 + R2}{R1} - IN \times \frac{R2}{R1} \times DUTY \quad (2a)$$

$$FB2 = FB - Voffset \quad (2b)$$
$$= FB - IN \times \frac{R5}{R4} \times DUTY$$

In equation (2a), the first term on the right side is a constant factor independent of input/output conditions (DUTY), and the second term on the right side is a variable factor dependent on the input/output conditions (DUTY).

Additionally in the equation (2b), the first term on the right side is the feedback voltage FB, and the second term on the right side is a variable factor dependent on the input/output conditions (DUTY). In addition, the second term on the right side is a term generated by applying the offset voltage Voffset.

Furthermore, in the offset adjustment portion 30, resistance values of the resistors R4 and R5 are adjusted by a manner in which the second term on the right side of equation (2a) and the second term on the right side of equation (2b) cancel each other, that is, a manner in which an equation R1:R2=R4:R5 is satisfied.

Figure 8:
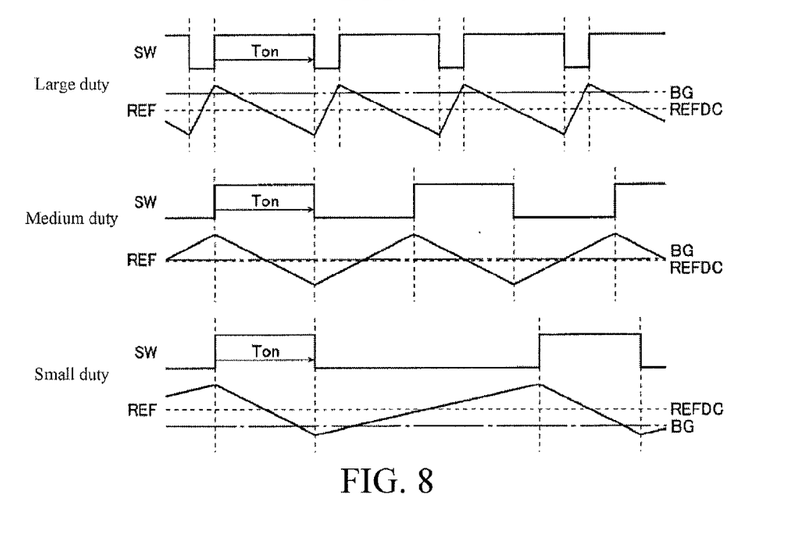
FIG. 8 is a waveform diagram of SW duty dependence of a ripple reference voltage REF.

For example, as shown in FIG. 8, by setting the configuration, the DC value (REFDC) of the ripple reference voltage REF varies according to duty of the switch voltage SW, and when the variation incurs an unintended DC offset to the output voltage OUT (specifically the feedback voltage FB), the voltage value of the reference voltage FB can be automatically adjusted by eliminating the DC offset, thereby improving the precision of the output voltage or the load regulation characteristic as in the first embodiment.

<Third Embodiment>

Figure 9:
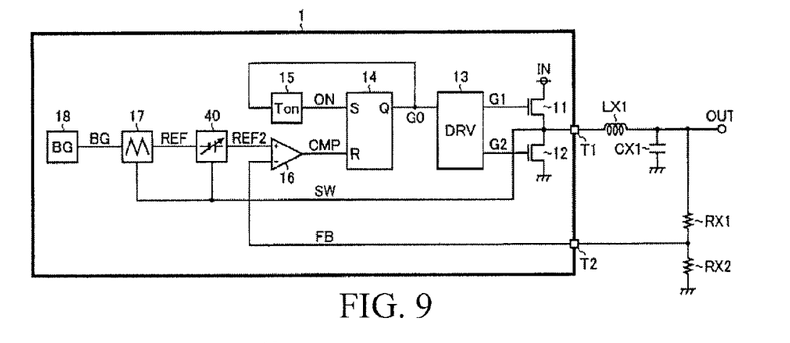
FIG. 9 is a circuit block diagram of a third embodiment of the switching power supply device according to the present invention.

FIG. 9 is a circuit block diagram of a third embodiment of the switching power supply device according to the present invention. The third embodiment includes substantially the same configuration as the first embodiment, with the differences lying in the following configuration. An offset adjustment portion 40 is set to replace the offset adjustment portion 20. The offset adjustment portion 40 generates the offset voltage Voffset corresponding to the switch voltage SW, and adds the offset voltage Voffset to the ripple reference voltage REF to generate a ripple reference voltage REF2 having an offset.

Figure 10:
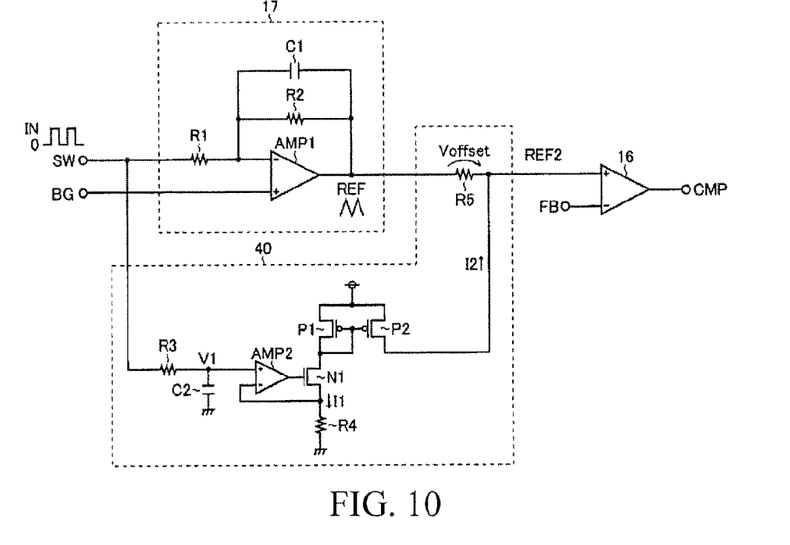
FIG. 10 is a circuit block diagram of a configuration example of an offset adjustment portion 40.

FIG. 10 is a circuit block diagram of a configuration example of the offset adjustment portion 40. The offset adjustment portion 40 of the configuration example includes substantially the same configuration as the offset adjustment portion 20 of the first configuration example shown in FIG. 3, but a difference lies in an insertion position of the resistor R5. The connection relationship is described below in detail with respect to parts different from those in FIG. 3. The first end (the high level end) of the resistor R5 is connected to the application end of the ripple reference voltage REF2 having the offset. The second end (the low level end) of the resistor R5 is connected to the application end of the ripple reference voltage REF.

Herein, the ripple reference voltage REF2 having the offset and generated in the offset adjustment portion 40 is acquired through equation (3) below.

[Equation 3]

$$REF2 = REF + Voffset \quad (3)$$
$$= BG \times \frac{R1 + R2}{R1} - IN \times \frac{R2}{R1} \times DUTY + IN \times \frac{R5}{R4} \times DUTY$$

In equation (3), the first term on the right side is a constant factor independent of input/output conditions (DUTY), and the second term and the third term on the right side are variable factors dependent on the input/output conditions (DUTY). In addition, the third term on the right side is a term generated by applying the offset voltage Voffset.

Furthermore, in the offset adjustment portion 40, resistance values of the resistors R4 and R5 are adjusted by a manner in which the second term and the third term on the right side cancel each other, that is, a manner in which an equation R1:R2=R4:R5 is satisfied.

By setting the configuration, the ripple reference voltage REF2 having the offset is determined only according to the first term on the right side of the equation (3), so that the ripple reference voltage REF2 having the offset can be generated independent of the input/output conditions (DUTY). Further, the precision of the output voltage or the load regulation characteristic can be improved as in the first embodiment.

<Examples of Other Variations>

The embodiments describe examples in which the present invention is configured with the switching power supply device using the lower limit detection on-time fixed manner, but the present invention is not limited to such application. The present invention may also be widely applied in other switching power supply devices using a nonlinear control manner (hysteretic window manner or upper limit detection off-time fixed manner).

In addition, various modifications may be made to the configuration of the present invention without departing from the spirit of the present invention. That is, all of the contents in the embodiments shall be construed as exemplary, not limitations. The technical scope of the present invention is defined by the claims rather than the description of the embodiments, and shall be construed to include all modifications not departing in meaning and scope from that equivalent to the claims.

For example, the embodiments describe the example of a configuration in which the semiconductor device 1 has built-in output transistor 11 and synchronous rectification transistor 12, but the configuration of the present invention is not limited thereto, and the transistors may be disposed externally. The switching power supply device according to the present invention is well-adapted for application in a personal computer, a liquid crystal display (LCD) television (TV) set, and a digital versatile disc (DVD) video recorder.

While several embodiments of the present invention have been illustrated and described, various modifications and improvements can be made by those skilled in the art. The embodiments of the present invention are therefore described in an illustrative but not in a restrictive sense. It is intended that the present invention should not be limited to the particular forms as illustrated and that all modifications which maintain the spirit and scope of the present invention are within the scope defined in the appended claims.

What is claimed is:

1. A switching power supply device operable to use a nonlinear control manner that switches on/off a switch element to generate an output voltage from an input voltage, the switching power supply device comprising:
   a reference voltage generation portion for generating a reference voltage;
   a ripple injection portion operable to use a switch voltage at one end of the switch element to generate a ripple component, and to inject the ripple component into the reference voltage to generate a ripple reference voltage;
   a comparator operable to compare a feedback voltage corresponding to the output voltage with the ripple reference voltage;
   a switching control portion operable to perform on/off control on the switch element based on an output signal of the comparator; and
   an offset adjustment portion operable to generate an offset voltage corresponding to the switch voltage, and setting any of the reference voltage, the feedback voltage, and the ripple reference voltage to the offset voltage,
   wherein the ripple injection portion comprises a first amplifier having a non-inverting input end connected to an application end of the reference voltage, an inverting input end connected to an application end of the switch voltage through a first resistor, and an output end connected to an application end of the ripple reference voltage and also connected to the inverting input end through a second resistor and a first capacitor, respectively.

2. The switching power supply device according to claim 1, wherein the offset adjustment portion comprises:
   a filter circuit, for smoothing the switch voltage to generate a smoothed switch voltage;
   a voltage/current conversion circuit, for converting the smoothed switch voltage into an offset current; and
   a current/voltage conversion circuit, for converting the offset current into the offset voltage.

3. The switching power supply device according to claim 2, wherein the filter circuit comprises:
   a third resistor, having a first end connected to the application end of the switch voltage and a second end connected to an application end of the smoothed switch voltage; and
   a second capacitor, having a first end connected to the application end of the smoothed switch voltage and a second end connected to a grounding end.

4. The switching power supply device according to claim 3, wherein the voltage/current conversion circuit comprises:
   a fourth resistor;
   a bias circuit, for applying the smoothed switch voltage to the fourth resistor; and
   a current mirror circuit, for mirroring a current flowing into the fourth resistor to generate the offset current.

5. The switching power supply device according to claim 4, wherein the bias circuit comprises:
   a second amplifier, having a non-inverting input end connected to the application end of the smoothed switch voltage and an inverting input end connected to the fourth resistor; and
   an N-channel type field-effect transistor (FET), having a drain connected to the current mirror circuit, a source connected to the fourth resistor, and a gate connected to an output end of the second amplifier.

6. The switching power supply device according to claim 5, wherein the current/voltage conversion circuit comprises a fifth resistor for converting the offset current into the offset voltage.

7. The switching power supply device according to claim 6, wherein the offset adjustment portion is configured to set the reference voltage to the offset voltage, and enable an equation $(R1+R2):R2=R4:R5$ to be satisfied when resistance values of the first resistor, the second resistor, the fourth resistor, and the fifth resistor are set to $R1$, $R2$, $R4$, and $R5$.

8. The switching power supply device according to claim 6, wherein the offset adjustment portion is configured to set the feedback voltage or the ripple reference voltage to the offset voltage, and enable an equation $R1:R2=R4:R5$ to be satisfied when resistance values of the first resistor, the second resistor, the fourth resistor, and the fifth resistor are set to $R1$, $R2$, $R4$, and $R5$.

9. The switching power supply device according to claim 4, wherein the bias circuit comprises:
   a constant current source, having a first end connected to a power supply end;
   a pnp-type bipolar transistor, having an emitter connected to a second end of the constant current source, a collector connected to the grounding end, and a base connected to the application end of the smoothed switch voltage; and
   an npn-type bipolar transistor, having a collector connected to the current mirror circuit, an emitter connected to the fourth resistor, and a base connected to the emitter of the pnp-type bipolar transistor.

10. The switching power supply device according to claim 9, wherein the current/voltage conversion circuit comprises a fifth resistor for converting the offset current into the offset voltage.

11. The switching power supply device according to claim 10, wherein the offset adjustment portion is configured to set the reference voltage to the offset voltage, and enable an equation $(R1+R2):R2=R4:R5$ to be satisfied when resistance values of the first resistor, the second resistor, the fourth resistor, and the fifth resistor are set to $R1$, $R2$, $R4$, and $R5$.

12. The switching power supply device according to claim 10, wherein the offset adjustment portion is configured to set the feedback voltage or the ripple reference voltage to the offset voltage, and enable an equation $R1:R2=R4:R5$ to be satisfied when resistance values of the first resistor, the second resistor, the fourth resistor, and the fifth resistor are set to $R1$, $R2$, $R4$, and $R5$.

13. The switching power supply device according to claim 4, wherein the current/voltage conversion circuit comprises a fifth resistor for converting the offset current into the offset voltage.

14. The switching power supply device according to claim 13, wherein the offset adjustment portion is configured to set the reference voltage to the offset voltage, and enable an equation $(R1+R2):R2=R4:R5$ to be satisfied when resistance values of the first resistor, the second resistor, the fourth resistor, and the fifth resistor are set to $R1$, $R2$, $R4$, and $R5$.

15. The switching power supply device according to claim 13, wherein the offset adjustment portion is configured to set the feedback voltage or the ripple reference voltage to the offset voltage, and enable an equation R1:R2=R4:R5 to be satisfied when resistance values of the first resistor, the second resistor, the fourth resistor, and the fifth resistor are set to R1, R2, R4, and R5.

* * * * *